US011728671B2

(12) United States Patent
James (10) Patent No.: US 11,728,671 B2
(45) Date of Patent: Aug. 15, 2023

(54) ASSEMBLY AND METHOD FOR POWERING AN ELECTRIC AIRCRAFT AND/OR AN ELECTRIC AIRCRAFT EQUIPPED WITH SAID ASSEMBLY

(71) Applicant: Saronikos Trading and Services, Unipessoal LDA, Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 515 days.

(21) Appl. No.: 16/639,003

(22) PCT Filed: Aug. 15, 2017

(86) PCT No.: PCT/IB2017/054958
§ 371 (c)(1),
(2) Date: Feb. 13, 2020

(87) PCT Pub. No.: WO2019/034908
PCT Pub. Date: Feb. 21, 2019

(65) Prior Publication Data
US 2020/0361338 A1    Nov. 19, 2020

(51) Int. Cl.
*H01M 10/44* (2006.01)
*H01M 10/46* (2006.01)
(Continued)

(52) U.S. Cl.
CPC ............... *H02J 7/34* (2013.01); *B60L 8/003* (2013.01); *B60L 50/60* (2019.02); *B60L 50/70* (2019.02);
(Continued)

(58) Field of Classification Search
CPC .......... B60L 50/70; B60L 53/00; B60L 8/003; B60L 58/12; B60L 2200/10; B60L 50/60;
(Continued)

(56) References Cited

U.S. PATENT DOCUMENTS 9,376,208 B1 *   6/2016  Gentry .................. B64D 27/24
2009/0032648 A1   2/2009  Pearson
(Continued)

OTHER PUBLICATIONS

International Search Report dated May 11, 2018, issued in PCT Application No. PCT/IB2017/054958, filed Aug. 15, 2017.
(Continued)

*Primary Examiner* — Edward Tso
(74) *Attorney, Agent, or Firm* — Workman Nydegger (57) ABSTRACT

An assembly and a method for powering an electric aircraft by way of a supplementary energy-supplying device. The electric energy delivered by such device reduces the energy drawn from the battery and recharges the battery when the supplementary electrical power exceeds that consumed. A greater extension of the flight time may be achieved by defining a number of energy profiles that can be automatically activated by energy management components. In the preferred embodiment of the invention, the supplementary energy-supplying device is a photovoltaic film covering at least a portion of a frame of the aircraft. The invention relates also to an electric aircraft equipped with the assembly.

14 Claims, 3 Drawing Sheets

(51) Int. Cl.
*H02J 7/34* (2006.01)
*B60L 53/00* (2019.01)
*B60L 50/60* (2019.01)
*B60L 50/70* (2019.01)
*B60L 58/12* (2019.01)
*B60L 8/00* (2006.01)
*B64C 39/02* (2023.01)
*B64D 27/24* (2006.01)
*B64D 41/00* (2006.01)
*H02J 3/38* (2006.01)
*B64U 10/13* (2023.01)
*B64U 50/19* (2023.01)
*B64U 50/34* (2023.01)

(52) U.S. Cl.
CPC ............... *B60L 53/00* (2019.02); *B60L 58/12* (2019.02); *B64C 39/024* (2013.01); *B64D 27/24* (2013.01); *B64D 41/00* (2013.01); *H02J 3/381* (2013.01); *B60L 2200/10* (2013.01); *B64D 2041/005* (2013.01); *B64D 2211/00* (2013.01); *B64U 10/13* (2023.01); *B64U 50/19* (2023.01); *B64U 50/34* (2023.01); *H02J 2300/24* (2020.01); *H02J 2310/44* (2020.01)

(58) Field of Classification Search
CPC .......... H02J 3/381; H02J 7/34; H02J 2310/44; H02J 2300/24; H02J 7/0068; B64D 27/24; B64D 41/00; B64D 2211/00; B64D 2041/005; B64C 39/024; B64C 2201/042; B64C 2201/027; B64C 2201/066; Y02T 90/14; Y02T 10/70; Y02T 90/40; Y02T 10/7072; Y02E 10/56; B64U 50/19; B64U 50/34
USPC ..... 320/104, 107, 114, 132, 148, 115; 701/3
See application file for complete search history.

(56) References Cited

U.S. PATENT DOCUMENTS

| | | | |
|---|---|---|---|
| 2014/0158816 A1* | 6/2014 | DeLorean | B64C 39/04 244/12.4 |
| 2014/0023241 A1 | 8/2014 | Hayashi et al. | |
| 2017/0072812 A1* | 3/2017 | Von Novak | H01M 10/4257 |
| 2017/0183095 A1* | 6/2017 | Liu | H02S 20/30 |
| 2017/0225781 A1* | 8/2017 | Almasoud | H04B 7/18506 |
| 2018/0050798 A1* | 2/2018 | Kapuria | B60L 58/12 |
| 2018/0287833 A1* | 10/2018 | Kennedy | H04L 25/26 |

OTHER PUBLICATIONS

Written Opinion dated May 11, 2018, issued in PCT Application No. PCT/IB2017/054958, filed Aug. 15, 2017.

* cited by examiner

ASSEMBLY AND METHOD FOR POWERING AN ELECTRIC AIRCRAFT AND/OR AN ELECTRIC AIRCRAFT EQUIPPED WITH SAID ASSEMBLY

FIELD OF THE INVENTION

The present invention relates to an assembly and a method for powering an electric remote controlled aircraft; in particular, it deals with the management of the electric energy stored in energy storage means and the energy supplied by supplementary-energy supplying means. The invention relates also to an electric aircraft equipped with said assembly.

Description of Prior Art

Commercial UAVs (Unmanned Aerial Vehicles), commonly known as drones, are becoming increasingly popular thanks to recent technology advancements. Nowadays these vehicles are made in a variety of different sizes (the smallest ones can fit in the palm of a hand) and are used for both professional and leisure activities, such as surveying, mapping, geographic information systems, inspections, science and research, monitoring and security, search and rescue, aerial video and photography, including the so called "selfies" (i.e. photographic portraits). In the latter case, a drone can carry a camera or a smartphone as a payload, thus replacing the selfie stick and allowing the user to take selfies in a more comfortable and flexible manner.

The most popular commercial types of drones are equipped with electric motors, and are powered by batteries. For these electric aircrafts, the energy they need to fly is still a crucial aspect, because the battery capacity should be chosen as a tradeoff between flight time and weight, and the best compromise is often unsatisfactory for the user.

SUMMARY OF THE INVENTION

It is therefore an object of the present invention to provide an assembly and a method for improving the powering an electric aircraft so as to control the amount of energy taken from the on board battery and thereby increasing the flight time. Another object of the present invention is an electric aircraft equipped with an improved system to reduce the amount of energy taken from the on board battery and thereby increasing the flight time.

The above objects are achieved by an assembly and/or an aircraft comprising, among others, energy storage means (e.g. a battery), supplementary-energy supplying means, and energy management means configured for estimating a charge level of the energy storage means, and regulating, on the basis of said charge level and the electric current flowing through the energy storage means, a supplementary electric current generated from said supplementary-energy supplying means, in order to reduce the amount of electric power supplied by said energy storage means to the electric aircraft when the power consumed by said aircraft exceeds the output power of said supplementary-energy supplying means, and to recharge said energy storage means when the output power of said supplementary-energy supplying means exceeds the power consumed by said aircraft.

In this way, the flight time of the aircraft increases.

The intervals and/or moments when the battery might be recharged are optimized by defining, for the aircraft, energy profiles offering different trade-offs between energy consumption on one side and capabilities and performance of the aircraft on the other side.

In an embodiment of the invention, the supplementary-energy supplying means is a photovoltaic film that may cover (or wrap) different parts of the aircraft (e.g. frame body, frame arms, or the like).

In other embodiments, the supplementary-energy supplying means may be the battery of an electric payload that can supply energy to its carrying aircraft. Interesting cases of these particular electric payloads are smartphones that might be carried by the aircraft for taking selfies.

Other supplementary-energy supplying means may be fuel cells and other types of electric generators suitable for aircraft application.

Combinations of different energy sources may be considered as well, since the contribution of a plurality of energy sources can be jointly optimized by the energy management means of the invention. In particular, the combination of a photovoltaic film with the battery of an electric payload (e.g. a smartphone) may be advantageously considered.

BRIEF DESCRIPTION OF THE DRAWINGS

The features of the invention are specifically set forth in the claims annexed to this description; such features will become clearer from the following description of a preferred and non-exclusive embodiment shown in annexed drawings, wherein:

DETAILED DESCRIPTION OF THE INVENTION

In this description, any reference to "an embodiment" will indicate that a particular configuration, structure or feature, described in regard to the implementation of the invention, is comprised in at least one embodiment. Therefore, the expression "in an embodiment" and other similar phrases, which may be present in different parts of this description, will not necessarily be all related to the same embodiment. Furthermore, any particular configuration, structure or feature may be combined in one or more embodiments, in any way deemed appropriate. The numerical references below are therefore used only for the sake of simplicity, and do not limit the protection scope or extension of the invention and the various embodiments thereof.

Figure 1:
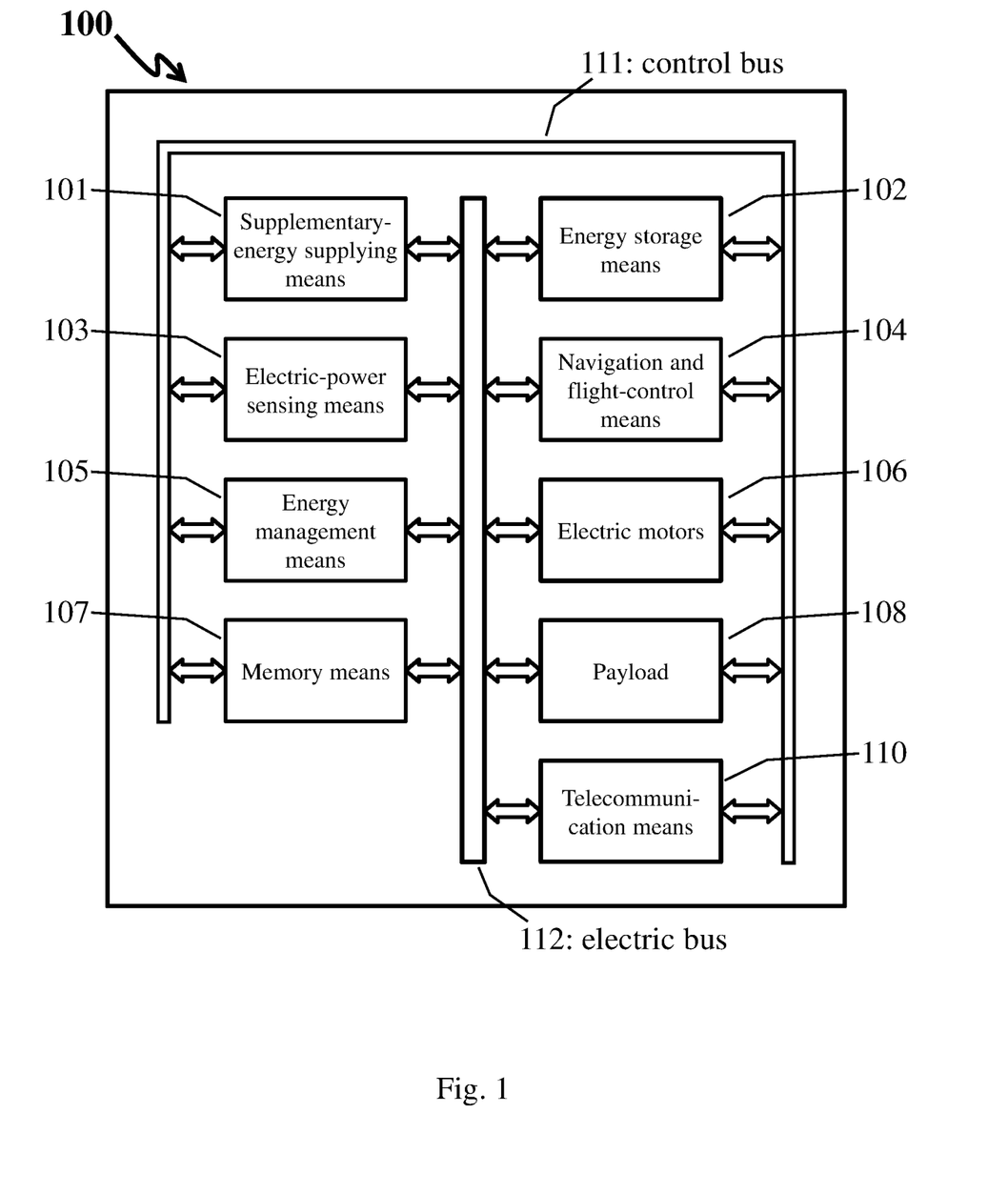
FIG. 1 shows a block diagram depicting the main components of an electric aircraft comprising an assembly according to the invention.

As shown in FIG. 1, an assembly 100 for powering an electric aircraft 200, according to the invention, comprises the following parts:

energy storage means 102, typically a LiPo (Lithium-Ion Polymer) battery, for storing electric energy to power electric motors and electronic circuitry;

supplementary-energy supplying means 101 adapted to provide a supplementary energy to the electric aircraft 200, possibly comprising their own voltage and/or current controls to interface with external regulation means;

electric-power sensing means 103 (e.g. a shunt resistor and a couple of voltage meters, wherein the first voltage meter measures the battery voltage, whereas the second voltage meter measures the voltage across said shunt resistor, i.e. the current intensity and its direction) adapted to detect and/or measure voltages of said energy storage means 102 and electric currents flowing through said energy storage means 102, and estimate the power consumed by a single element of the assembly 100 and/or by the whole aircraft and/or the electric power delivered by a source of electric energy;

energy management means 105 (e.g. a microcontroller and/or voltage regulator, or the like) configured for performing the followings steps:

estimating a charge level of the energy storage means 102 on the basis of the voltages and the electric currents detected and/or measured by the electric-power sensing means 103, regulating, on the basis of said charge level and of said electric currents flowing through said energy storage means 102, a supplementary electric current generated by said supplementary-energy supplying means 101 in order to reduce the amount of electric power supplied by said energy storage means 102 to said electric aircraft 200 when the power consumed by said aircraft 200 exceeds the output power of said supplementary-energy supplying means 101, and to recharge said energy storage means 102 when the output power of said supplementary-energy supplying means 101 exceeds the power consumed by said aircraft 200.

Summarizing, when the assembly 100 is in an operating condition, the energy management means 105 executes a method for powering an electric aircraft 200 according to the invention. This method comprises the following phases:

an acquisition phase, wherein the voltages of energy storage means 102 and the electric currents flowing therethrough are detected and/or measured by means of the electric-power sensing means 103;

a charge estimation phase, wherein the charge level of the energy storage means 102 is estimated, by means of energy management means 105, on the basis of said voltages and said electric currents detected and/or measured by said electric-power sensing means 103;

a regulation phase, wherein the supplementary electric current is generated from the supplementary-energy supplying means 101 adapted to provide a supplementary energy to said electric aircraft 200, and wherein said supplementary electric current is regulated, through the energy management means 105, on the basis of said charge level and of said electric currents flowing through said energy storage means 102 in order to reduce the amount of electric power supplied by said energy storage means 102 to said electric aircraft 200 when the power consumed by said aircraft 200 exceeds the output power of said supplementary-energy supplying means 101, and to recharge said energy storage means 102 when the output power of said supplementary-energy supplying means 101 exceeds the power consumed by said aircraft 200.

In this way, the flight time of the aircraft increases, because the energy drawn from the energy storage means 102 reduces.

In a possible variant of the invention, the assembly 100 may also comprise:

memory means 107 containing at least software codes or parts thereof, and data; and at least one electric motor 106 for providing a thrust to the electric aircraft, preferably through a propeller coupled to the shaft of the electric motor.

In this variant, the energy management means 105 are configured for executing the following steps:

calculating, by data delivered by said electric-power sensing means 103 and/or data stored in said memory means 107, power consumption data representing the electric power absorbed by said electric aircraft 200;

reading, from said supplementary-energy supplying means 101 and/or from the data stored in said memory means 107, energy supply capability data representing the energy supply capability of said supplementary-energy supplying means 101;

reading, from said energy storage means 102 and/or from data stored in said memory means 107, maximum recharge current data representing the maximum recharge current of said energy storage means 102, i.e. the maximum allowed current for recharging said energy storage means without damaging them;

acquiring the charge level of the energy storage means 102;

regulating the current supplied by said supplementary-energy supplying means 101 to said energy storage means 102 on the basis of said power consumption data, said energy supply capability data, and charge level, so as to provide a recharge current that is less then or equal to that maximum recharge current represented by said maximum recharge current data.

In this way, the flight time of the aircraft 200 increases, because the energy storage means store additional energy. In addition to that, these features make it possible to draw less current from the energy storage means 102, so that the flight time increases.

Furthermore, the assembly 100 may also comprises the following parts (which will be better detailed later on in this description):

navigation and flight-control means 104, for acquiring orientation, motion, and position data, calculating fly commands, and driving electric motors 106;

payload 108, which may have additional energy-storage means, i.e. means that can supply additional electric energy to said electric aircraft 200;

telecommunication means 110, for communications with a remote control.

Figure 2:
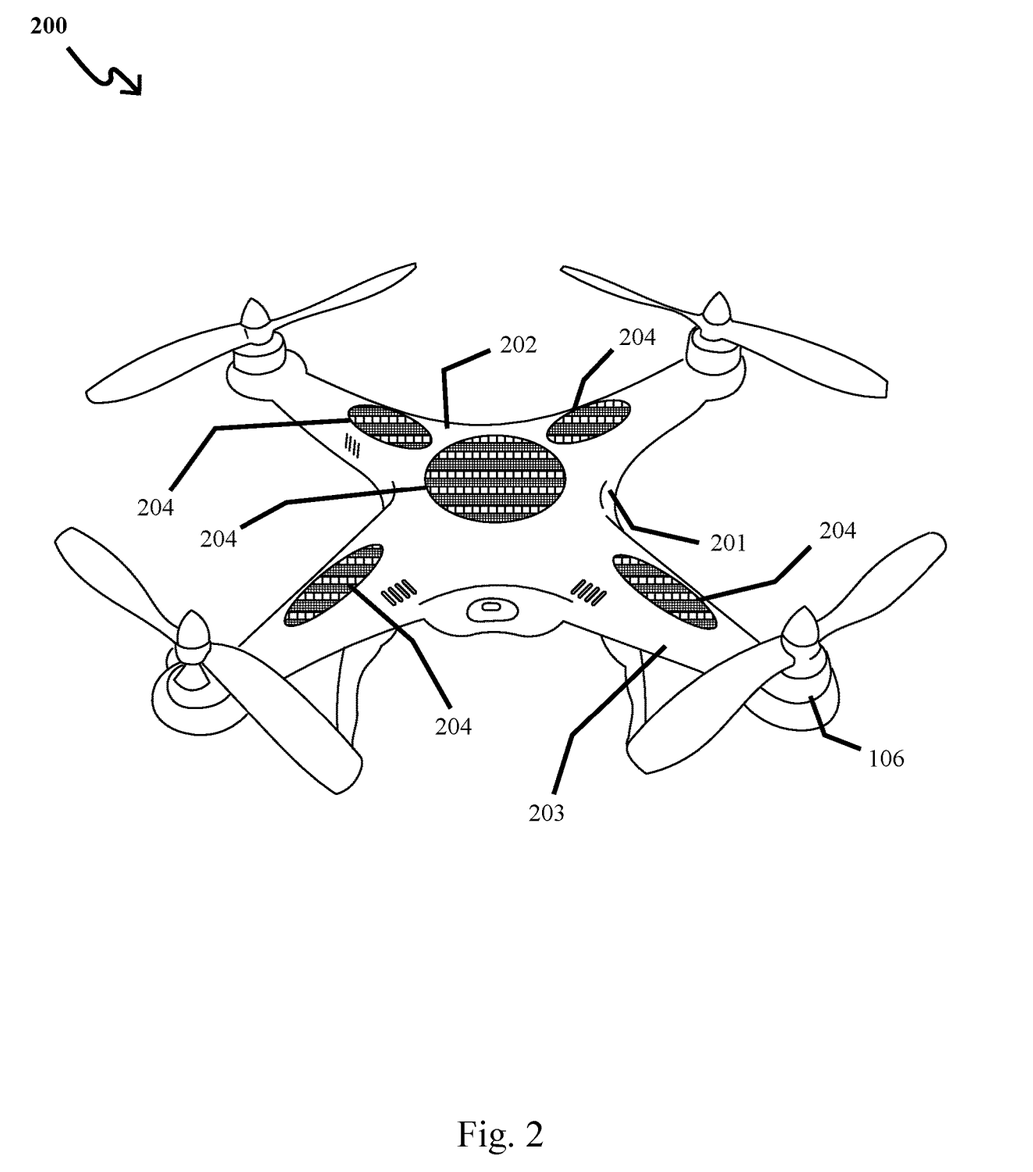
FIG. 2 shows the electric aircraft of FIG. 1 with photovoltaic film supplying supplementary electric energy.

With also reference to FIG. 2, the aircraft 200 may comprise a frame 201 comprising a main body 202 and at least a frame arm 203 (preferably four) attached to the main body 202, wherein the motor 106 is positioned at the end of said at least one frame arm 203, absorbs electric energy from an electric bus 112 (i.e. the energy storage means 102 and the supplementary-energy supplying means 101), and is controlled by the navigation and flight-control means 104.

In an embodiment of the invention, the supplementary-energy supplying means 101 comprise a photovoltaic film 204 covering (or wrapped around) at least a portion of said frame 201.

With the technological progress in the photovoltaic cells, a photovoltaic film 204 capable of producing tens of watts could weight few grams and have a high efficiency to convert sunlight into electricity (see for example http://news.mit.edu/2016/ultrathin-flexible-solar-cells-0226).

More in details, this photovoltaic film 204 may be positioned to cover different parts of the aircraft 200, such as (the upper portion of) the frame arm 203 and/or of the main body 202, or the like. In this way, said film 204 improves the mechanical properties of the frame 201 (e.g. by increasing the load section of the arm and/or by damping vibrations), by making possible to reduce advantageously the weight of said frame 201. This makes it possible to reduce the electrical power absorbed by the motor 106 from said main energy storage means 102, so that the flight time of said aircraft 200 increases.

In some cases the aircraft 200 may comprise a wing, or a number of wings, attached to the frame 201. In such cases, a large area is available for harvesting energy by photovoltaic film 204. Moreover, in some phases of flight, the lift generated by the wings may result in a significant reduction of the electrical power consumption of the aircraft motors 106; hence, the combination of a large area for collecting photovoltaic energy with the reduction of the power consumption of the motors significantly increases the ratio of the supplementary energy to the consumed energy, thus offering not only a reduction of the energy drain from the energy storage means 102, but also chances to have an excess of supplementary power for recharging the energy storage means 102. This will increase the flight time of said aircraft 200.

The motor 106 comprises a stator part and a rotor part (comprising a motor shaft), wherein the stator part comprises coils of wire, whereas the rotor part may comprise a plurality of permanent magnets positioned so as to interact with the magnetic field produced by the coils when an electrical current passes through them. Said motor can be of out-runner type (i.e. the rotor around the stator) or in-runner type (i.e. the stator around the rotor).

The photovoltaic film 204 may also be applied over the stator of the motor 106. This solution is particularly advantageous for in-runner motor type because the stator have a larger surface, and said film can be connected to the energy management means 105 through a couple of wires.

In case the motor is of out-runner type, the photovoltaic film may also be applied over the rotor part. This solution requires a pair of electric brushes positioned around the motor shaft, wherein said electric brushes connect the photovoltaic film to the energy management means 105.

In case the photovoltaic film is positioned over a propeller coupled with the shaft of the motor 106, the motor may comprise a pair of electric brushes positioned around the motor shaft, wherein said electric brushes connect the photovoltaic film of the propeller (or of the rotor) to the energy management means 105. More in details, said shaft or any other rotor parts that are in contact with said propeller may comprise a couple of electrical contacts in electrical connection with the photovoltaic film positioned over the surface of said propeller, wherein each of said electrical contacts is connected with one of the electric brushes positioned around the motor shaft. In this way, it is possible to increase the aircraft surface on which the photovoltaic film can be positioned. This makes it possible to reduce the electrical power absorbed by the motor 106 from said main energy storage means 102, so that the flight time of said aircraft 200 increases.

In other embodiments of the invention, the supplementary-energy supplying means 101 comprise fuel cells or other types of electric generators or a combination of any type of electric generators without departing from the basic inventive idea, as the skilled person understands.

The electric-power sensing means 103 are to be considered in a broad sense. They may be regular means for measuring current and voltage or may be means for acquiring information from which a power delivery or a power consumption can be evaluated. An example of the latter case is the evaluation of the power consumption of the electric motors of the aircraft that could be obtained by acquiring information, via a control bus 111, on their driving signals, which could be available from the navigation and flight-control means 104.

Similarly, the energy management means 105 must be considered in a broad sense. They may comprise regular voltage and/or current regulators or other types of regulators that affect a change of a delivered electric power. For example, in some embodiments of the invention, the photovoltaic film may feature the capability to be oriented and the energy management means 105 are configured for calculating (during the regulation phase) positional and orientation data representing an absolute position and an attitude (i.e. an orientation) of said electric aircraft 200, wherein the photovoltaic film 204 comprises actuation means (e.g. a multi-axis gimbal or the like) adapted to orientate said photovoltaic film 204 with respect to the frame of said electric aircraft 200, and wherein said energy management means 105 are also configured for orientating said photovoltaic film 204, by means of said actuation means, on the basis of said positional and orientation data. In this way, it is possible to maximize the energy production of the photovoltaic film 204 by keeping them directed towards a light source, so that the flight time increases.

The energy management means 105 may be also configured for managing the capabilities and performance of the aircraft, so as to make it possible, for example, to reduce performance and/or capabilities when there is a need to reduce the power consumption. In particular, the energy management means 105 defines a number of "energy profiles", each characterized, for example, by the availability of some capabilities, a performance level of the aircraft 101, and a power consumption.

Considering a first embodiment of the invention, in which the supplementary-energy supplying means 101 are implemented by a photovoltaic film and the energy storage means 102 are implemented by a battery of LiPo technology, the basic ideas of the invention are now described.

The electric power that a photovoltaic film can produce is largely variable, depending on the solar altitude angle, clouds presence, obstructing obstacles, and orientation of the photovoltaic film with respect to the direction from which the light comes. On the other hand the power consumption of an electric aircraft can change depending on the aircraft maneuvers being performed (e.g. takeoff, landing, hovering, high rate climbing), payload, and wind. As result of the above variabilities, the difference between the available supplementary electric power and the electric power consumed by the aircraft 200 can vary in a large range. In particular, it can range from positive to negative values, i.e. from conditions in which you have an excess of electric power that can be used to charge the battery, to conditions in which the electric power supplied by the supplementary-energy supplying means 101 can only reduce the battery drain.

When there is an excess of electric power that can be used to recharge the battery, it has to be considered that there are limits to the recharging electric current, therefore a regulation of the electric power supplied by the supplementary-energy supplying means 101 is needed. In the invention, the regulation of the recharging current is performed by the energy management means 105 that are configured for implementing the criteria that are now described also with reference to FIG. 3, considering as energy storage means 102 a rechargeable LiPo battery, as said above.

Figure 3:
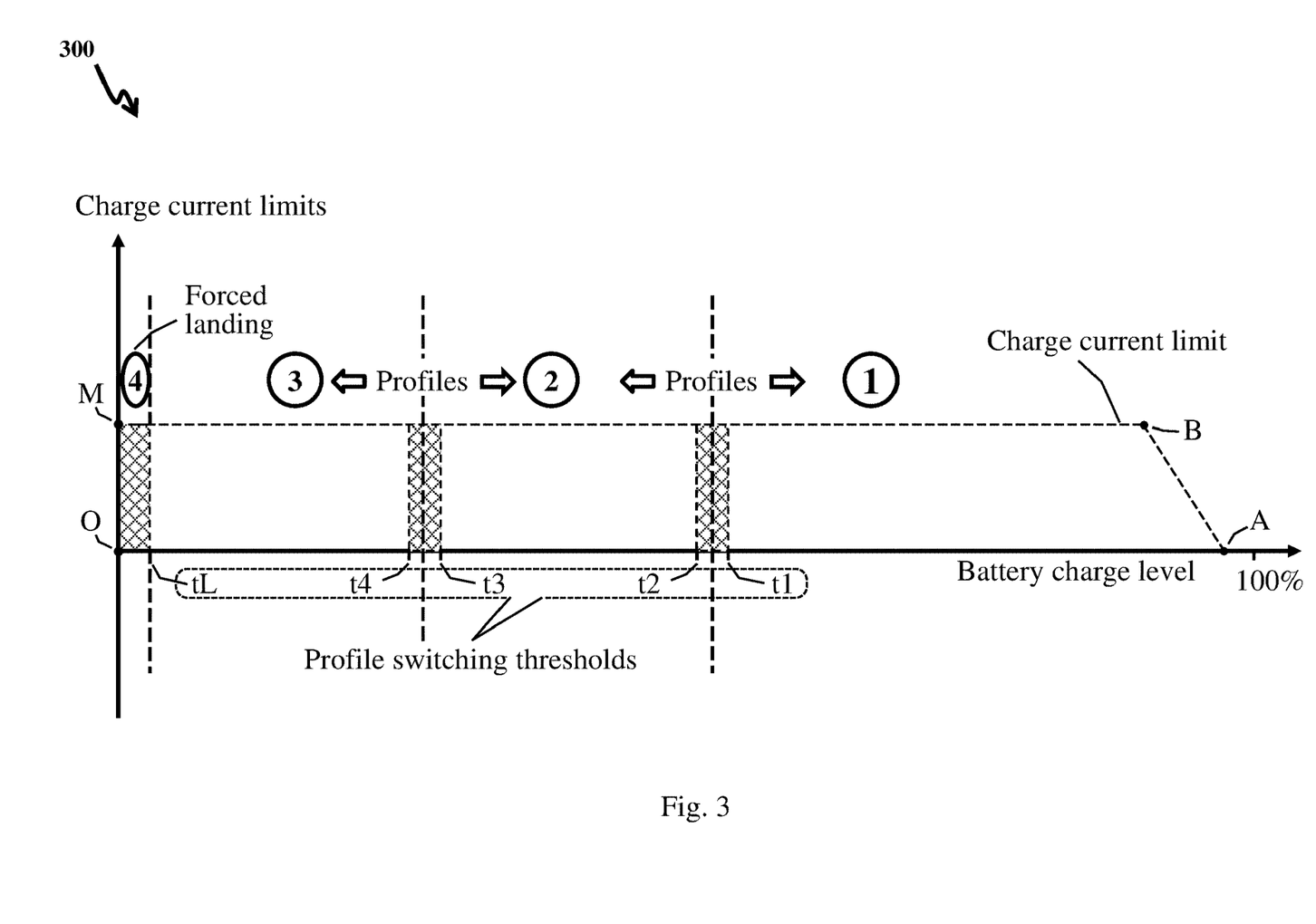
FIG. 3 shows a graph depicting a possible exemplary way to manage a supplementary electric energy and an energy stored in the energy storage means.

The horizontal axis (abscissa) of the graph of FIG. 3 represents the battery charge level as a percentage of the full-charge, while the vertical axis (ordinate) represents the charge current limit. The chart contains also other data that will be discussed later on.

For a large range of the battery charge level, corresponding in FIG. 3 to the dashed segment MB, the charge current must not exceed a $C_{Max}$ value corresponding to the ordinate of point M. Therefore, in that range, the charge current could fluctuate between zero and $C_{Max}$ and the energy management means 105 have to ensure that the charge current does not exceeded $C_{Max}$ by limiting the electric current delivered by the supplementary-energy supplying means 101. In this case, the limit to the electric current delivered by the supplementary-energy supplying means 101 is $C_{Max}$ plus the power consumed by the aircraft.

Above the range corresponding to the segment MB, the limit to the charge current gradually decreases, along the segment BA, and reaches zero at a point A, where the charge level is lower than 100%. This is because, in the case of the LiPo technology, it is advisable not to charge the battery up 100%, mainly when the battery is installed into an electronic device where it can alternatively supply power or store power, and it is also advisable to gradually reduce the charge current with the charge level approaching its maximum.

The energy management means 105 of the invention ensure that the charge current absorbed by the battery from the electric bus 112 remains within the right-angled trapezoid ABMO; hence, the first part of this power management procedure can be summarized as follows:
- the elements of the assembly 100 are in signal communication through the control bus 111 and get or supply electric energy through the electric bus 112;
- the energy storage means 102 have the capability to supply energy and receive a recharge current (through the electric bus 112) with specified limits to the maximum recharge current, whose data are made available through the control bus 111;
- the total electric power consumed by the electric aircraft 200 is evaluated by means of the electric-power sensing means 103 and/or from data stored in the memory means 107;
- the energy management means 105 may be configured for performing the following steps:
  - obtaining the energy supply capability of the supplementary-energy supplying means 101 from the supplementary-energy supplying means 101 themselves and/or from data stored in the memory means 107,
  - acquiring the limits to the maximum recharge current of the energy storage means 102,
  - evaluating the charge level of the storage means 102,
  - regulating the amount of power supplied by the supplementary-energy supplying means 101 so as to provide a recharge current to the energy storage means 102, complying with the specified limits to the maximum recharge current, on the basis of the total electric power consumed by the electric aircraft 200, the energy supply capability of the supplementary-energy supplying means 101, and the level of energy stored in the energy storage means 102.

In order to extend the flight time, some energy profiles may be provided, wherein said profiles trade-off performance and/or capabilities against power consumption. For example, in case of video drones you could reduce the resolution of video recording, while in general cases you could prune some flight modes, such as tracking and following the user, and/or you could reduce performance, such as maximum speed, maximum climb rate, and other capabilities. Such trade-offs not only involve reduction of the power consumption, but also increase the probability that the supplementary power delivered by the supplementary-energy supplying means 101 be higher than the power consumed by the aircraft 200, thus allowing some battery recharge.

The chart of FIG. 3 shows an example of power management comprising four energy profiles:
- Profile 1: maximum performance, maximum power consumption;
- Profile 2: balanced power/performance;
- Profile 3: minimum performance, minimum power consumption;
- Profile 4 or landing profile: performance and capabilities strictly required for landing.

The above profiles may be activated by the user through a remote control and telecommunication means 110, through which the user may also receive information on the aircraft status and, in particular, on the battery charge level.

However, the energy profiles may also be activated by the energy management means 105, on the basis of the battery charge level, as explained below with reference to FIG. 3.

In the range above a first threshold t1 of the battery charge level, the energy management means 105 activate Profile 1. With the reduction of the battery level, the energy management means 105 maintain Profile 1 as long as the battery level passes the first threshold t1 and reaches a second threshold t2, at which the energy management means 105 switch to Profile 2. With the reduction of the battery level below threshold t2, the energy management means 105 maintain Profile 2 as long as the battery level passes a third threshold t3 and reaches a fourth threshold t4, at which the energy management means 105 switch to Profile 3. With the reduction of the battery level below threshold t4, the energy management means 105 maintain Profile 3 as long as the battery level reaches a fifth threshold tL, at which the energy management means 105 switch to the forced landing profile, and the aircraft lands.

Instead, if before reaching threshold tL the battery starts being recharged and its charge level increases, with the increase of the battery level the energy management means 105 maintain Profile 3 as long as the battery level passes the fourth threshold t4 and reaches the third threshold t3, at which the energy management means 105 switch to Profile 2. With the increase of the battery charge level above threshold t3 the energy management means 105 maintain Profile 2 as long as the battery level passes the second threshold t2 and reaches the first threshold t1, at which the energy management means 105 switch to Profile 1.

Generally speaking, the energy management means 105 regulate the capabilities and performance of the electric aircraft 200 by switching at least between two energy profiles, on the basis of at least the charge level of the energy storage means 102. Thus, the energy management means 105 activate the relevant profile to trade-off the aircraft performance against the probability to recharge its battery, with the exception that, under a battery level tL, the energy management means 105 activate an irreversible procedure for forcing the aircraft to land.

Summarizing, the energy management means 105 may be also configured for regulating (during the regulation phase), through the navigation and flight-control means 104, the capabilities and performance of the electric aircraft 200 by switching between at least two energy profiles on the basis of at least the charge level of said energy storage means 102, wherein each profile defines at least the maximum speed and/or acceleration and/or inclination achievable by said aircraft 200.

The above described management of the aircraft energy components and the energy profile advantageously increases the chances to recharge the aircraft battery during flight, thus increasing the available flight time.

In another embodiment the invention the supplementary-energy supplying means 101 are fuel cells or other types of electric generators, without departing from the basic idea illustrated above.

In another embodiment of the invention, the supplementary-energy supplying means 101 are the storage means of a payload carried by the aircraft. An example of such a payload is a smartphone carried for taking pictures or selfies. Commercial smartphones have in fact a 5-pin Micro-USB connector through which data and electric power can flow. Some commercial products already allows external USB hardware to interact with Android-powered devices (see https://source.android.com/devices/accessories/protocol). Anyway, the skilled person can devise many solutions, and suitable interfaces, for exploiting a smartphone, or another device equipped with a battery, as a supplementary-energy supplying means 101. In other words, the energy storage means of a payload could act as supplementary-energy supplying means 101.

In another embodiment of the invention, the assembly 100 comprises both supplementary-energy supplying means 101 and a payload with energy storage means with a capability to supply additional electric energy to the electric aircraft 200, preferably through the electric bus 112, i.e. the a payload 108 may comprise second energy storage means that contributes to the generation of the supplementary electric current.

In such case, the energy management means 105 are preferably configured for jointly regulating the amount of energy supplied by both the supplementary-energy supplying means 101 and the energy storage means of the payload 108 by weighting the limitations to the two energy sources on the basis of their maximum input/output power and/or their available energy in such a way as to comply with the specifications for operating the energy storage means 102.

In another embodiment of the invention, the assembly 100 comprises a plurality of supplementary-energy supplying means 101 and the electric currents of the supplementary-energy supplying means are jointly regulated by weighting the limitations to each energy sources on the basis of their maximum output power and/or their available energy, by means of the energy management means 105, so as to comply with the specifications for operating the energy storage means 102. In other words, the assembly 100 may comprise, in addition to the features of the previously described embodiments, the following parts:
- at least one second supplementary-energy supplying means (e.g. a second LIPO battery, a fuel cell or the like) generating a second supplementary electric current that contributes to the generation of the supplementary electric current generated by the (previously described) supplementary-energy supplying means 101;
- current control means for controlling the electric current supplied by each said at least one second supplementary-energy supplying means, e.g. a set of PWM (Pulse-Width Modulation) current regulators or the like;

Moreover, the energy management means 105 are also configured for (jointly) regulating (during the regulation phase) the electric currents of each of the supplementary-energy supplying means, through the current control means, on the basis of said charge level of the energy storage means 102, in order that
- the output of each of said at least one second supplementary-energy supplying means do not exceed an its own maximum value, and/or
- the charge level of each of said at least one second supplementary-energy supplying means do not fall below an its own minimum value, and/or
- the electric current flowing into each of said at least one second supplementary-energy supplying means is less than a maximum recharge current.

In particular, the energy management means 105 may also comprise payload control means (e.g. a PWM current regulator or the like) for controlling the supplementary electric current delivered by the energy storage means of the payload (second supplementary electric current), and wherein said energy management means 105 are also configured for performing the following steps:
- estimating a charge level of said second energy storage means by means of the electric-power sensing means 103;
- regulating (during the regulation phase) the second supplementary electric current, through said payload control means, on the basis of said regulation of the supplementary electric current generated by said supplementary-energy supplying means 101, in order that
  - the output power of said second energy storage means does not exceed a maximum threshold, and/or
  - the charge level of said second energy storage means does not fall below a minimum threshold, and/or
  - the electric current flowing into said energy storage means 102 is less than a maximum recharge current.

In this way, it is possible to extend the flight time of the aircraft.

More in general, a plurality of supplementary electric currents may be generated by a plurality of supplementary-energy supplying means 101. The energy management means 105 may comprise current control means (e.g. a PWM current regulator or the like) configured for regulating (during the regulation phase) each electric current of said plurality of supplementary electric currents on the basis of the charge level of said energy storage means 102, in order to meet the following conditions:
- the output current of each of said plurality of supplementary-energy supplying means 101 does not exceed at least one upper threshold associated to said supplementary-energy supplying means 101;
- the energy level of each of said plurality of supplementary-energy supplying means 101 does not fall below at least one lower threshold associated to said supplementary-energy supplying means 101;
- when said energy storage means 102 are recharging, the electric current flowing into said energy storage means 102 is less than a maximum recharge current.

Furthermore, the assembly (100) may comprise connection means adapted to connect a kinetic generator (e.g. an inertial mass coupled with a piezoelectric generator, a linear generator comprising a coil and a magnet moving within the coil, or the like) to the control bus 111 and the electric bus 112. In this case, the energy management means 105 are also adapted to control the supplementary energy provided by said kinetic generator and the energy management means 105 are configured for performing the following phases:
- detecting if the kinetic generator is connected to said control bus 111 and said electric bus 112;

reading, from said kinetic generator and/or from the data stored in the memory means 107, energy supply capability data representing the energy supply capability of said kinetic generator;

jointly regulating the amount of energy supplied, to the energy storage means 102, by both the supplementary-energy supplying means 101 and the kinetic generator, by weighting the limitations to the two energy sources on the basis of their maximum output power and/or their available energy, in such a way as to comply with the specifications for operating the energy storage means 102.

In other words, the assembly 100 comprises connection means adapted to connect a kinetic generator, and wherein said energy management means 105 are also configured for regulating a recharging current passing through said connection means, in order to recharge said energy storage means 102 without exceeding a maximum charge level.

Before taking off the kinetic generator can be separated from the electric aircraft 200 in order to reduce the overall weight of the aircraft 200. This makes it possible to extend the flight time further.

The present description has tackled some of the possible variants, but it will be apparent to the person skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. An assembly for powering an electric aircraft, comprising:
   energy storage means for storing electric energy,
   electric-power sensing means adapted to detect or measure voltages of said energy storage means and electric currents flowing through said energy storage means,
   supplementary-energy supplying means adapted to provide a supplementary energy to said electric aircraft,
   energy management means configured for:
      estimating a charge level of said energy storage means on the basis of said voltages and said electric currents detected or measured by said electric-power sensing means, and
      regulating, on the basis of said charge level and of said electric currents flowing through said energy storage means, a supplementary electric current generated by said supplementary-energy supplying means in order to reduce the amount of electric power supplied by said energy storage means to said electric aircraft when the power consumed by said aircraft exceeds the output power of said supplementary-energy supplying means, and to recharge said energy storage means when the output power of said supplementary-energy supplying means exceeds the power consumed by said aircraft,
   navigation and flight-control means for controlling the flight of said electric aircraft, wherein said energy management means are also configured for changing, through said navigation and flight-control means, the capabilities and performance of said electric aircraft by switching between at least two energy profiles on the basis of at least the charge level of said energy storage means, wherein each profile defines at least the maximum speed or acceleration or inclination achievable by said aircraft.

2. The assembly according to claim 1, wherein said supplementary-energy supplying means comprise a photovoltaic film which can be positioned over said aircraft.

3. The assembly according to claim 1, wherein said supplementary-energy supplying means comprise fuel cells or other types of electric generators.

4. The assembly according to claim 1, further comprising a payload comprising second energy storage means that contributes to the generation of the supplementary electric current by generating a second supplementary electric current.

5. The assembly according to claim 4, further comprising payload control means for controlling said second supplementary electric current, wherein said energy management means are also configured for:
   estimating a charge level of said second energy storage means by means of said electric-power sensing means, and
   regulating said second supplementary electric current, through said payload control means, on the basis of the supplementary electric current generated by said supplementary-energy supplying means, in order that:
      the output power of said second energy storage means do not exceed a maximum threshold, or
      the charge level of said second energy storage means do not fall below a minimum threshold, or
      the electric current flowing into said energy storage means is less than a maximum recharge current.

6. The assembly according to claim 1, wherein said assembly further comprises connection means adapted to connect a kinetic generator, and wherein said energy management means are also configured for regulating a recharging current passing through said connection means, in order to recharge said energy storage means without exceeding their maximum input power or a maximum charge level.

7. An aircraft comprising the assembly according to claim 1.

8. The aircraft according to claim 7, comprising a wing for generating lift, wherein said photovoltaic film covers at least a portion of said wing.

9. The aircraft according to claim 7, comprising a frame that comprises a main body and at least a frame arm attached to the main body, and wherein said photovoltaic film covers at least a portion of said at least one frame arm or said main body.

10. A method for powering an electric aircraft, comprising:
   an acquisition phase, wherein voltages of energy storage means for storing electric energy, and electric currents flowing therethrough are detected or measured by means of electric-power sensing means,
   a charge estimation phase, wherein a charge level of the energy storage means is estimated, by means of energy management means, on the basis of said voltages and said electric currents detected or measured by said electric-power sensing means,
   a regulation phase, wherein a supplementary electric current is generated from a supplementary-energy supplying means adapted to provide a supplementary energy to said electric aircraft, and wherein said supplementary electric current is regulated, through the energy management means, on the basis of said charge level and of said electric currents flowing through said energy storage means, in order to reduce the amount of electric power supplied by said energy storage means to said electric aircraft when the power consumed by said aircraft exceeds the output power of said supplementary-energy supplying means, and to recharge said energy storage means when the output power of said supplementary-energy supplying means exceeds the power consumed by said aircraft, wherein, during the regulation phase, the capabilities and performance of said electric aircraft are switched, by means of navigation and flight-control means, between at least two energy profiles on the basis of at least the charge level of said energy storage means, wherein each profile defines at least the maximum speed or acceleration or inclination achievable by said aircraft.

11. The method for powering an electric aircraft according to claim 10, wherein, during the regulation phase, a recharging current, which is generated by a kinetic generator and passes through connection means, is regulated, in order to recharge said energy storage means without exceeding their maximum input power or their maximum energy capacity.

12. The method for powering an electric aircraft according to claim 10, wherein, during the regulation phase, a second supplementary electric current contributing to the generation of the supplementary electric current is generated by second energy storage means comprised in a payload, and the energy management means performs the steps of
  estimating a charge level of said second energy storage means by means of said electric-power sensing means, and
  regulating said second supplementary electric current, through payload control means, on the basis of the supplementary electric current generated by said supplementary-energy supplying means, in order that:
    the output power of said second energy storage means does not exceed a maximum threshold, or
    the charge level of said second energy storage means does not fall below a minimum threshold, or
    the electric current flowing into said energy storage means is less than a maximum recharge current.

13. The method for powering an electric aircraft according to claim 10, wherein, during the regulation phase, a plurality of supplementary electric currents are generated by a plurality of supplementary-energy supplying means, and the energy management means is configured for regulating each electric current of said plurality of supplementary electric currents, through current control means, on the basis of said charge level of said energy storage means, in order that:
  the output current of each of said plurality of supplementary-energy supplying means does not exceed at least one upper threshold associated to said supplementary-energy supplying means,
  the energy level of each of said plurality of supplementary-energy supplying means does not fall below at least one lower threshold associated to said supplementary-energy supplying means, and,
  when said energy storage means are recharging, the electric current flowing into said energy storage means is less than a maximum recharge current.

14. An assembly for powering an electric aircraft, comprising:
  energy storage means for storing electric energy,
  supplementary-energy supplying means adapted to provide a supplementary energy to said electric aircraft,
  electric-power sensing means adapted to detect or measure voltages of said energy storage means and electric currents flowing through said energy storage means,
  energy management means for executing software codes and configured for:
    estimating a charge level of said storage means on the basis of said voltages and said electric currents detected or measured by said electric-power sensing means,
    regulating the supplementary energy provided by said supplementary-energy supplying means,
    managing capabilities and performance of the electric aircraft,
  memory means containing at least software codes or parts thereof and stored data, and
wherein said energy management means are configured for:
  calculating, by data delivered by said electric-power sensing means or data stored in said memory means, power consumption data representing the electric power absorbed by said electric aircraft,
  reading, from said supplementary-energy supplying means or from the data stored in said memory means, energy supply capability data representing the energy supply capability of said supplementary-energy supplying means,
  reading, from said energy storage means or from data stored in said memory means, maximum recharge current data representing the maximum recharge current of said energy storage means,
  acquiring the charge level of said storage means, and
  regulating the amount of power supplied by said supplementary-energy supplying means to said energy storage means on the basis of said power consumption data, said energy supply capability data, and said charge level, so as to provide a recharge current that is less than or equal to said maximum recharge current represented by said maximum recharge current data; and
  navigation and flight-control means for controlling the flight of said electric aircraft, wherein said energy management means are also configured for changing, through said navigation and flight-control means, the capabilities and performance of said electric aircraft by switching between at least two energy profiles on the basis of at least the charge level of said energy storage means, wherein each profile defines at least the maximum speed or acceleration or inclination achievable by said aircraft.

* * * * *